United States Patent
Chen et al.

(10) Patent No.: US 11,810,250 B2
(45) Date of Patent: Nov. 7, 2023

(54) SYSTEMS AND METHODS OF HIERARCHICAL IMPLICIT REPRESENTATION IN OCTREE FOR 3D MODELING

(71) Applicant: TENCENT AMERICA LLC, Palo Alto, CA (US)

(72) Inventors: Weikai Chen, Shenzhen (CN); Bo Wang, Shenzhen (CN); Songrun Liu, Shenzhen (CN); Bo Yang, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 50 days.

(21) Appl. No.: 17/364,576

(22) Filed: Jun. 30, 2021

(65) Prior Publication Data

US 2023/0005217 A1    Jan. 5, 2023

(51) Int. Cl.
| | |
|---|---|
| *G06T 17/00* | (2006.01) |
| *G06T 7/60* | (2017.01) |
| *G06T 17/20* | (2006.01) |
| *G06N 20/00* | (2019.01) |

(52) U.S. Cl.
CPC ........... *G06T 17/005* (2013.01); *G06N 20/00* (2019.01); *G06T 7/60* (2013.01); *G06T 17/20* (2013.01); *G06T 2207/20081* (2013.01); *G06T 2207/20084* (2013.01); *G06T 2210/56* (2013.01)

(58) Field of Classification Search
CPC ................................ G06V 20/39; G06V 20/64
See application file for complete search history.

(56) References Cited

U.S. PATENT DOCUMENTS

| | | | | |
|---|---|---|---|---|
| 8,488,877 | B1* | 7/2013 | Owechko | G06V 20/64 |
| | | | | 382/165 |
| 10,693,492 | B1* | 6/2020 | Lasserre | H03M 7/40 |
| 2020/0042863 | A1 | 2/2020 | Wang et al. | |
| 2020/0250540 | A1 | 8/2020 | Mehr | |
| 2023/0046917 | A1* | 2/2023 | Flynn | H04N 19/119 |

FOREIGN PATENT DOCUMENTS

| | | | | |
|---|---|---|---|---|
| CN | 106780716 A | * | 5/2017 | |
| WO | WO-2018127547 A1 | * | 7/2018 | G06T 15/04 |

OTHER PUBLICATIONS

Tencent Technology, ISR, PCT/US2022/018262, Jun. 24, 2022, 10 pgs.

* cited by examiner

*Primary Examiner* — Ming Wu
(74) *Attorney, Agent, or Firm* — Morgan, Lewis & Bockius LLP

(57) ABSTRACT

An electronic apparatus performs a method of representing a 3D shape that includes: dividing a 3D space enclosing the 3D shape into a plurality of 3D spaces with a hierarchical octree structure; generating local implicit functions, and each of the local implicit functions corresponds to a respective 3D space of the plurality of 3D spaces; and reconstructing a representation of the 3D shape from the local implicit functions with the hierarchical octree structure. In some embodiments, the 3D space is recursively subdivided into the child octants according to the surface occupancy and richness of the geometry of the 3D shape, and a respective local implicit function is generated corresponding to a geometry of a part of the surface.

20 Claims, 7 Drawing Sheets

500 dividing a 3D space enclosing the 3D shape into a plurality of 3D spaces with a hierarchical octree structure 502

generating local implicit functions, each of the local implicit functions corresponding to a respective 3D space of the plurality of 3D spaces 504

reconstructing a representation of the 3D shape from the local implicit functions with the hierarchical octree structure 506

FIG. 5

(a) Input (b) AOCNN (c) LIG (d) OccNet (e) IMNet (f) OctField

SYSTEMS AND METHODS OF HIERARCHICAL IMPLICIT REPRESENTATION IN OCTREE FOR 3D MODELING

TECHNICAL FIELD

The present disclosure relates generally to image technologies, and in particular, to image processing and three-dimensional (3D) model formation methods and systems.

BACKGROUND

Geometric 3D representation has been central to the tasks in computer vision and computer graphics, ranging from high-level applications, such as scene understanding, objection recognition and classification, to low-level tasks, including 3D shape reconstruction, interpolation, and manipulation.

While explicit 3D representations have been used in recent 3D learning approaches, none of those representations can satisfy all the desirable properties. Point cloud and voxel representations struggle to capture the fine-scale shape details—often at the cost of prohibitive memory requirements. Mesh-based learning approaches typically rely on deforming a template model, limiting its scalability to handle arbitrary topologies. The advent of neural implicit function has recently brought impressive advances to the state-of-the-art across a range of 3D modeling and reconstruction tasks. However, using only a global function for encoding the entirety of all shapes, the aforementioned methods often suffer from limited reconstruction accuracy and shape generality.

SUMMARY

To accommodate with various application scenarios, a universal and effective 3D representation for 3D deep learning should have the following properties: (1) compatibility with arbitrary topologies, (2) sufficient capacity of modeling fine geometric details, (3) scalability to intricate shapes, (4) support efficient encoding of shape priors, (5) compact memory footprint, and (6) high computational efficiency.

Localized implicit function is a flexible neural implicit representation that can handle arbitrary topologies. Localized implicit function is a powerful 3D shape representation of objects and scenes at different scales. However, the regular subdivision of 3D space employed by these approaches fails to consider the sparsity of the surface occupancy and the varying granularities of geometric details. As a result, its memory footprint grows cubically with the input volume, leading to a prohibitive computational cost even at a moderately dense decomposition of a regular-sized input volume.

In some embodiments, the method and system disclosed herein is called OctField. OctField combines the good ends of both localized implicit representations and the hierarchical data structure. By adaptively allocating local implicit functions according to the surface occupancy and the richness of geometry, OctField is able to achieve high modeling accuracy with a low memory and computational budget. In particular, the 3D space is decomposed into hierarchical local regions using the octree structure, where the finest octant encodes the partial shape within its enclosed space using a learned implicit function. The decomposition protocol not only considers the surface occupancy but also the richness of the geometry. The octants that carry an embedded implicit kernel are only allocated around the surface. Moreover, only the octants containing intricate geometries are further divided. This ensures an adaptive memory and computation allocation so that the richer surface details are captured with more local implicit functions—hence with higher modeling accuracy. In contrast, the unoccupied regions are not allocated with any implicit kernels to save the memory and computational budget.

In some embodiments, the octree itself is a non-differentiable discrete data structure. A novel differentiable hierarchical encoder-decoder network is implemented that learns both the octree structure and the geometry features simultaneously. In particular, the construction of octree is formulated as a probabilistic process where the probability of subdividing an octant is predicted by a Multilayer perceptron (MLP) layer. This makes it possible to learn discrete octree structure in a fully differentiable manner. In addition, the network is trained in manner similar to a Variational Autoencoders (VAE) such that the trained latent space and decoder can be used for a variety of downstream applications including shape reconstruction, generation, interpolation, and single-view reconstruction, etc.

Systems and methods of a novel 3D representation are disclosed herein that introduce hierarchical octree structure to the organization of local implicit functions to achieve significantly higher-precision modeling capability with even lower memory and computational budget. The 3D space is adaptively subdivided according to the surface occupancy and the richness of part geometry. As octree is discrete and non-differentiable, a novel hierarchical encoder-decoder network is also introduced that can learn both discrete octree structure and surface geometry in a differentiable manner in a deep neural network.

According to a first aspect of the present application, a method of representing a 3D shape includes: dividing a 3D space enclosing the 3D shape into a plurality of 3D spaces with a hierarchical octree structure; generating local implicit functions, and each of the local implicit functions corresponds to a respective 3D space of the plurality of 3D spaces; and reconstructing a representation of the 3D shape from the local implicit functions with the hierarchical octree structure.

In some embodiments, the dividing the 3D space enclosing the 3D shape into the plurality of 3D spaces with the hierarchical octree structure includes: recursively subdividing the 3D space into child octants according to surface occupancy and richness of geometry of the 3D shape.

In some embodiments, the dividing the 3D space enclosing the 3D shape into the plurality of 3D spaces with the hierarchical octree structure includes: training a neural network to divide the 3D space enclosing the 3D shape into the plurality of 3D spaces with the hierarchical octree structure.

In some embodiments, the generating the local implicit functions includes: in accordance with a determination that a respective 3D space encloses part of a surface of the 3D shape, generating a respective local implicit function corresponding to a geometry of the part of the surface.

In some embodiments, the generating the respective local implicit function corresponding to the geometry of the part of the surface includes: training a neural network to recognize the geometry of the part of the surface and to generate a respective local implicit function corresponding to the geometry of the part of the surface.

In some embodiments, the reconstructing the representation of the 3D shape from the local implicit functions with the hierarchical octree structure includes: reconstructing a 3D surface of the 3D shape within the respective 3D space with a respective local implicit function using geometry feature and 3D location of the 3D surface; and converting the local implicit functions within the hierarchical octree structure to a 3D mesh output.

According to a second aspect of the present application, an electronic apparatus includes one or more processing units, memory and a plurality of programs stored in the memory. The programs, when executed by the one or more processing units, cause the electronic apparatus to perform the one or more methods as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the one or more methods as described above.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 5 is a block diagram illustrating an exemplary 3D shape representation process using OctField in accordance with some implementations of the present disclosure.

Figure 1:
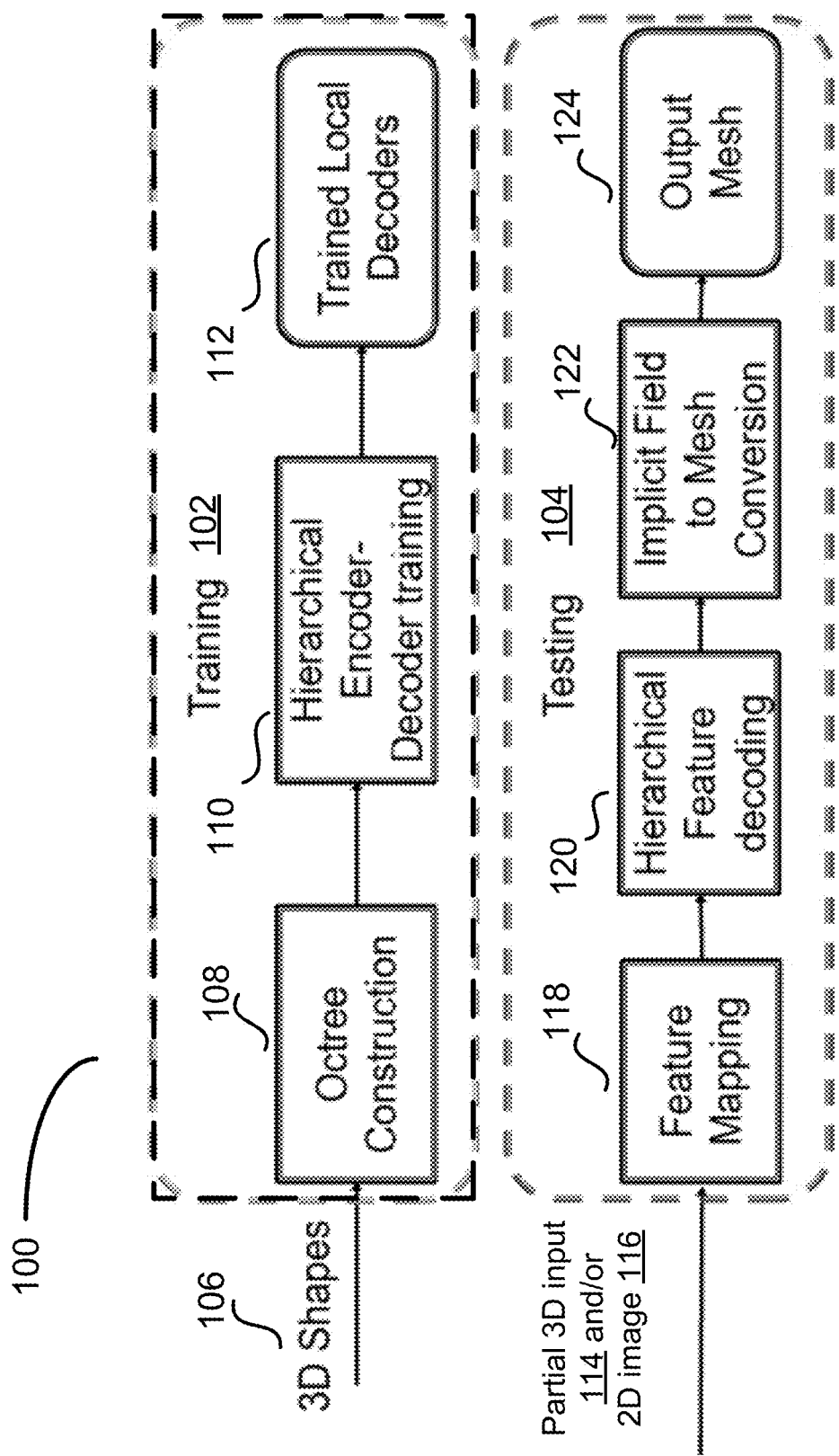
FIG. 1 is a diagram illustrating an exemplary process of representing a 3D shape by assigning local implicit functions to an octree structure in accordance with some implementations of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices.

Before the embodiments of the present application are further described in detail, names and terms involved in the embodiments of the present application are described, and the names and terms involved in the embodiments of the present application have the following explanations.

Multilayer perceptron (MLP): a class of feedforward artificial neural network (ANN) including at least three layers of nodes: an input layer, a hidden layer and an output layer Variational Autoencoders (VAE): generative models using a variational approach for latent representation learning whose posterior is approximated by a neural network, forming an autoencoder-like architecture.

Convolutional neural network (CNN): a class of deep neural networks, most commonly applied to analyzing visual imagery.

Kullback-Leibler (KL) divergence: a measure of how one probability distribution is different from a reference probability distribution.

IM-Net: an implicit field decoder for shape generation that is trained to perform the value assignment to each point in 3D space by means of a binary classifier to indicates whether the point is outside the shape or not.

Occupancy networks (OCCNet): a representation for learning-based 3D reconstruction that implicitly represents the 3D surface as the continuous decision boundary of a deep neural network classifier.

Local Implicit Grids (LIG): a 3D shape representation that trains an autoencoder to learn an embedding of local crops of 3D shapes at a geometric scale shared by surfaces and decodes a set of latent codes on a regular grid of overlapping crops.

Adaptive Octree-based Convolutional Neural Network (AOCNN). A Patch-based Deep Representation of 3D Shapes that takes the planar patch normal and displacement as input and performs 3D convolutions only at the octants at each level.

PointNet++: a deep learning method on point sets that has learning layers to adaptively combine features from multiple scales and it is a hierarchical neural network that applies a nested partitioning of the input point set.

Typical methods based on local implicit functions include Local implicit grid (LIG) and Local deep implicit functions for 3D shape (LDIF). Most 3D shapes are typically consisting of large smooth regions and small-scale sharp features. In addition, the surface of interest often consumes only a small portion of the entire space, leading to an extremely sparse space occupancy. However, the method based on local implicit functions fails to take the varying geometry richness and sparsity of surface into account. That leads to low computational efficiency and inefficient space subdivision. In particular, LIG subdivides the 3D space into regular girds in which most of the grid cells do not contain any geometry shapes of interest, leading to a waste of computational resources. As a result, both LIG and LDIF cannot scale to high-precision reconstruction of large scenes.

Neural Geometric Level of Details (NGLD) provides a fast rendering method of neural signed distance field (SDF). NGLD does not consider the geometry richness of surface. In addition, NGLD does not encode the structural information in an encoder-decoder framework. As a result, NGLD struggles to reconstruct 3D shapes with fine intricate details, especially when the target shape parts contain strong semantic structure.

To address the limitation of local implicit functions as described above, a novel 3D representation called OctField is disclosed herein, that introduces hierarchies to the organization of the local implicit functions to achieve a better memory efficiency and a stronger modeling capacity. OctField leverages a hierarchical data structure, Octree, to adaptively subdivide the 3D space according to the surface occupancy and the richness of geometrical details. In particular, regions enclosing intricate geometries are further subdivided to allocate more implicit kernels for higher modeling accuracy. In contrast, the stop of subdivision for octants containing smooth part geometry as a single implicit kernel would suffice for modeling. Further, implicit functions are not allocated in the unoccupied regions. Hence, OctField could obtain significantly increased representation accuracy with a slightly deeper octree subdivision, as the modeling capacity has been highly optimized to accommodate the varying granularity of surface details.

The systems and methods disclosed herein tackle the problems of NGLD discussed above with two solutions. First, a novel octree construction method is introduced that is adaptive to varying geometry granularities. Specifically, during the octree construction, OctField will further subdivides the cells that contain fine surface details. Therefore, at training and test time, more implicit functions will be allocated for modeling the parts with intricate geometry details, leading to a higher reconstruction accuracy. Second, a novel hierarchical network is implemented that recursively incorporates structural information into the encoder and decoder networks. This enables the systems and methods to fully leverage structural semantics of the 3D shape that could provide useful guidance of a surface modeling. The systems and methods disclosed herein are able to achieve reconstruction quality that is higher than NGLD.

In some embodiments, OctField is a learnable hierarchical implicit representation for 3D surfaces that allows high-precision encoding of intricate surfaces with low memory and computational budget. The inefficiency issue of the state-of-the-art 3D modeling and reconstruction methods based on local implicit functions is resolved. In particular, a hierarchical octree structure is implemented to adaptively subdivide the 3D space according to the surface occupancy and the richness of part geometry. As octree is discrete and non-differentiable, a novel hierarchical network is further utilized that recursively encodes and decodes both octree structure and surface geometry in a differentiable manner. The methods and systems disclosed herein features the advantages of both localized implicit representation and the hierarchical data structure. By associating a local implicit function with each octant cell, the 3D representation can model large-scale shape with fine-level details using compact storage. The 3D representation also reduces the computational cost. Therefore, the method and systems disclosed herein can speed up inference in evaluation. Based on the differentiable network, OctField can be applied in in a variety of tasks including 3D shape reconstruction, shape completion from partial and noisy inputs, and image-based 3D reconstruction, etc.

FIG. 1 is a diagram illustrating an exemplary process 100 of representing a 3D shape by assigning local implicit functions to an octree structure in accordance with some implementations of the present disclosure.

In some embodiments, the process includes two phases: training 102 and testing 104. During the training 102, the adaptive octree cells for a 3D shape 106 is first constructed in the training set in the octree construction step 108. Then a hierarchical encoder-decoder network is utilized to perform encoder-decoder training 110, which generates trained local decoders 112 that are deployed in testing 104. At test time, either a partial 3D input 114, such as a partial point cloud or mesh, and/or 2D images 116 can be accepted as the input. First, the feature extracted from the input is mapped 118 to the latent space of the trained local decoders 112. Then a hierarchical feature decoding 120 by a decoder is performed to obtain the constructed implicit field. After applying the constructed implicit field to mesh conversion 122, the output mesh 124 is reconstructed.

Figure 2:
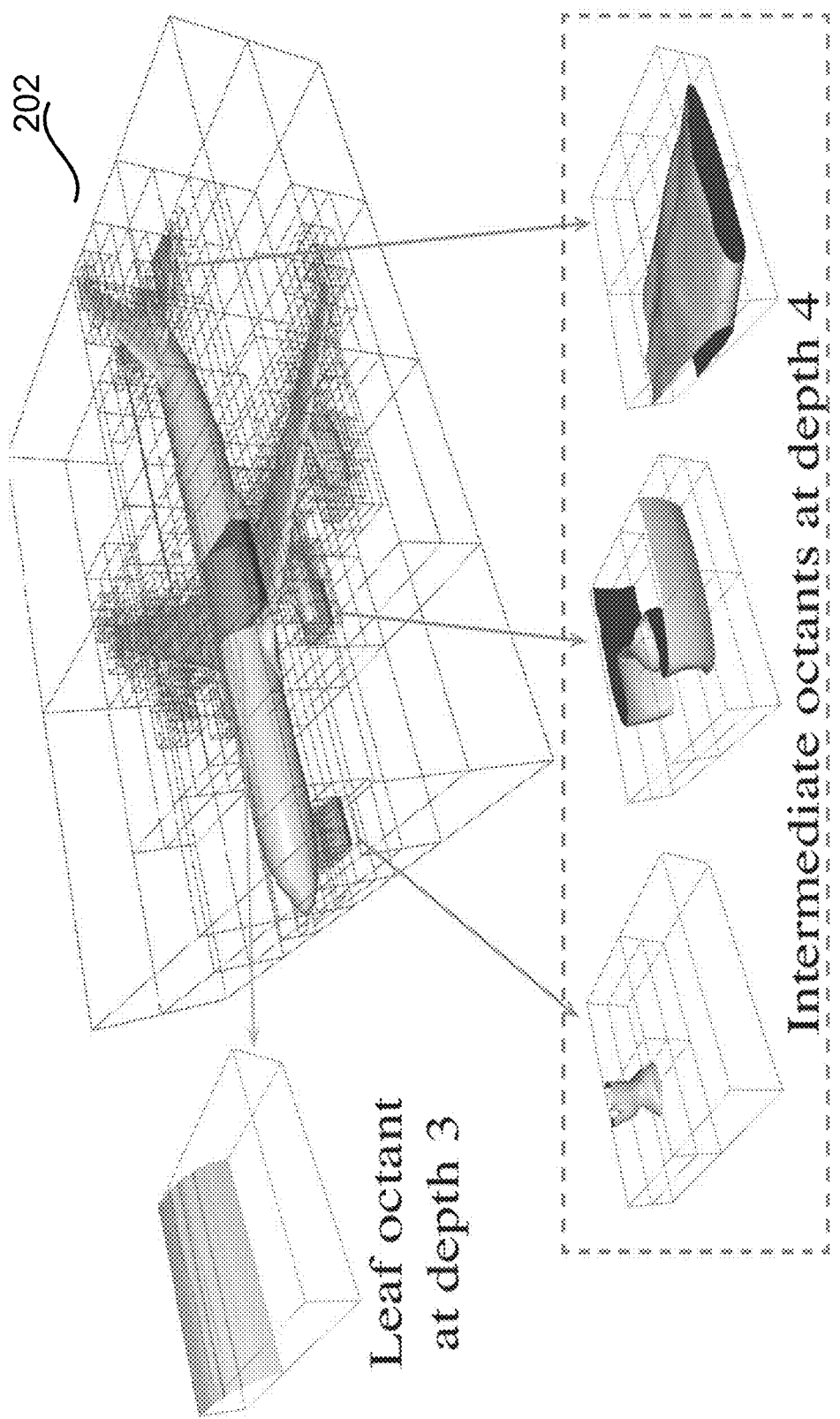
FIG. 2 is a diagram illustrating an exemplary OctField utilizing an octree structure to achieve a hierarchical implicit representation in accordance with some implementations of the present disclosure.

FIG. 2 is a diagram illustrating an exemplary OctField utilizing an octree structure to achieve a hierarchical implicit representation in accordance with some implementations of the present disclosure. The part of geometry enclosed by an octant is represented by a local implicit function. OctField is subdivided more adaptively in areas with rich geometric details to obtain higher modeling accuracy.

As shown in FIG. 2, OctField leverages a hierarchical data structure, Octree, to adaptively subdivide the 3D space according to the surface occupancy and the richness of geometrical details. In particular, regions enclosing intricate geometries will be further subdivided to allocate more implicit kernels for higher modeling accuracy. In contrast, subdivision is stopped for octants containing smooth part geometry as a single implicit kernel that would suffice for modeling. Further, any implicit functions are not allocated in the unoccupied regions. Hence, OctField could obtain significantly higher representation accuracy with a slightly deeper octree subdivision, as the modeling capacity has been adaptively optimized to accommodate the varying granularity of surface details. In particular, intricate parts such as jet engines, tail-planes and the undercarriage are automatically subdivided to engage more implicit kernels for higher modeling accuracy, while parts with regular shapes on the fuselage is encoded using a coarser-level representation that suffices.

In some embodiments, the implicit function associated with each octant is designed to model only part of the entire shape. To build an octree for the input model, the 3D shape is first uniformly scaled into an axis-aligned bounding box region 202 and then the bounding box region is recursively subdivided into child octants with different level of depth in a breadth-first order. FIG. 2 shows a leaf octant region at depth 3, and some other intermediate octants at depth 4. The decomposition protocol not only considers the surface occupancy but also the richness of geometry. As show in FIG. 2, the octants that carry an embedded implicit kernel will only be allocated around the surface. At each octant, the enclosed surface is continuously decoded from the local latent code.

In some embodiments, Octree construction is implemented. The octant to be subdivided has to satisfy two requirements simultaneously: (1) the octant encloses the surface of interest; and (2) its enclosed geometry needs to have sufficient complexity that is worth subdividing. The normal variation of the surface is used as an indicator of its geometric complexity. Specifically, the normal variation of a surface patch S is formulated as follows:

$$v(S)=E_i(v(n^i_x)+v(n^i_y)+V(n^i_z)) \quad (1)$$

where the $n^i_x$, $n^i_y$, $n^i_z$ are the x, y, z-component of the normal vector $n^i$ at the i-th sampling point on the surface; $v(\ )$ calculates the variations of the input while $E_i(\ )$ returns the expectation. In some embodiments, regular sampling is performed on the surface where the sampling points are pre-computed. The decomposition is repeated until the pre-defined depth d is reached or $v(S)$ is smaller than a pre-set threshold τ. In some embodiments, τ=0.1 is set throughout the construction.

In some embodiments, Local Implicit Representation is implemented. The implicit function associated with each octant is designed to model only part of the entire shape. This enables more training samples and eases the training as most 3D shapes share similar geometry at smaller scales. At each octant, the enclosed surface is continuously decoded from the local latent code. However, as the finest octant may have different sizes, when querying for the value of the local implicit function, the input world coordinate x against the center of the octant $x_i$ is normalized. Formally, the signed distance to the surface is encoded as:

$$f(c_i,x)=D_{\theta d}(c_i,N(x-x_i)) \quad (2)$$

where $D_{\theta d}$ is the learned implicit decoder with trainable parameter θd, $c_i$ is the local latent code and $N(\ )$ normalizes the input coordinate into the range of [−1, 1] according to the bounding box of the octant. To prevent the discontinuities across the octant boundaries, each octant is enlarged such that it overlaps with its neighboring octant at the same level. In this implementation, each octant has 50% overlap along the axis direction with its neighbors. When the implicit value at the overlapping regions is queried, tri-linear interpolation is performed over all the octants that intersect with this query position.

Figure 3:
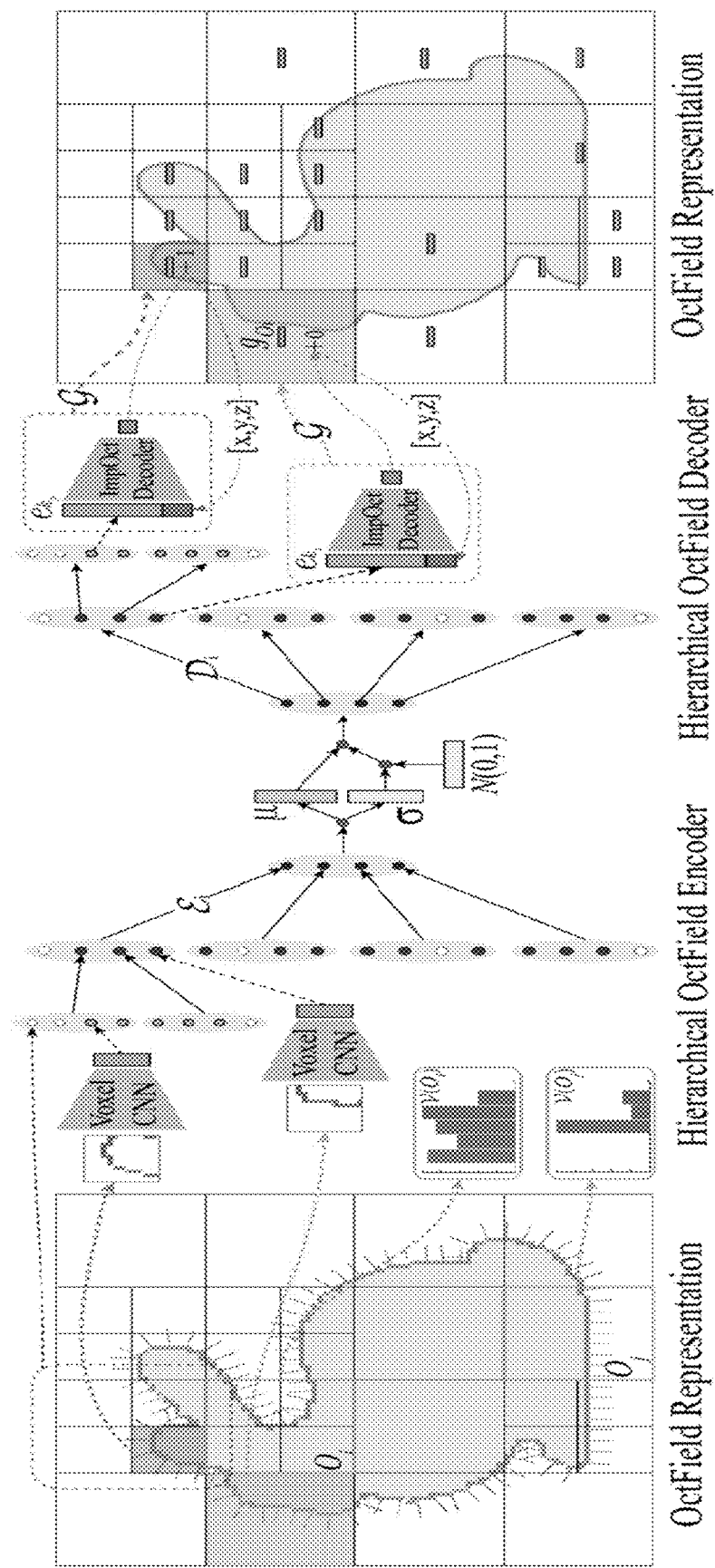
FIG. 3 is a diagram with an exemplary 2D illustration of the hierarchical encoder-decoder network in accordance with some implementations of the present disclosure.

FIG. 3 is a diagram with an exemplary 2D illustration of the hierarchical encoder-decoder network in accordance with some implementations of the present disclosure.

The hierarchical encoder-decoder network as shown in FIG. 3 (also shown as 110 in FIG. 1) is a recursive encoder-decoder structure. The encoder of the network is composed of a hierarchy of local encoders that encode local geometry feature and octree structure into the latent code. A 3D voxel Convolutional Neural Network (CNN) is employed for extracting the geometry features. After constructing the octree (also shown as 108 in FIG. 1) for the input model, the surface enclosed in each octant is voxelized in a resolution of $32^3$. The encoding process starts from the octants at the finest level in a bottom-up manner.

In some embodiments, the recursive encoder-decoder network is trained in a VAE manner. The voxel 3D CNN is implemented to encode the octants' geometry, and recursively aggregate the structure and geometry features using a hierarchy of local encoder $\{\varepsilon_i\}$. The decoding is implemented using a hierarchy of local decoders $\{D_i\}$ with a mirrored structure with respect to the encoder. Both the structure and geometry information are recursively decoded and the local surfaces are recovered using the implicit octant decoder within each octant.

Figure 4:
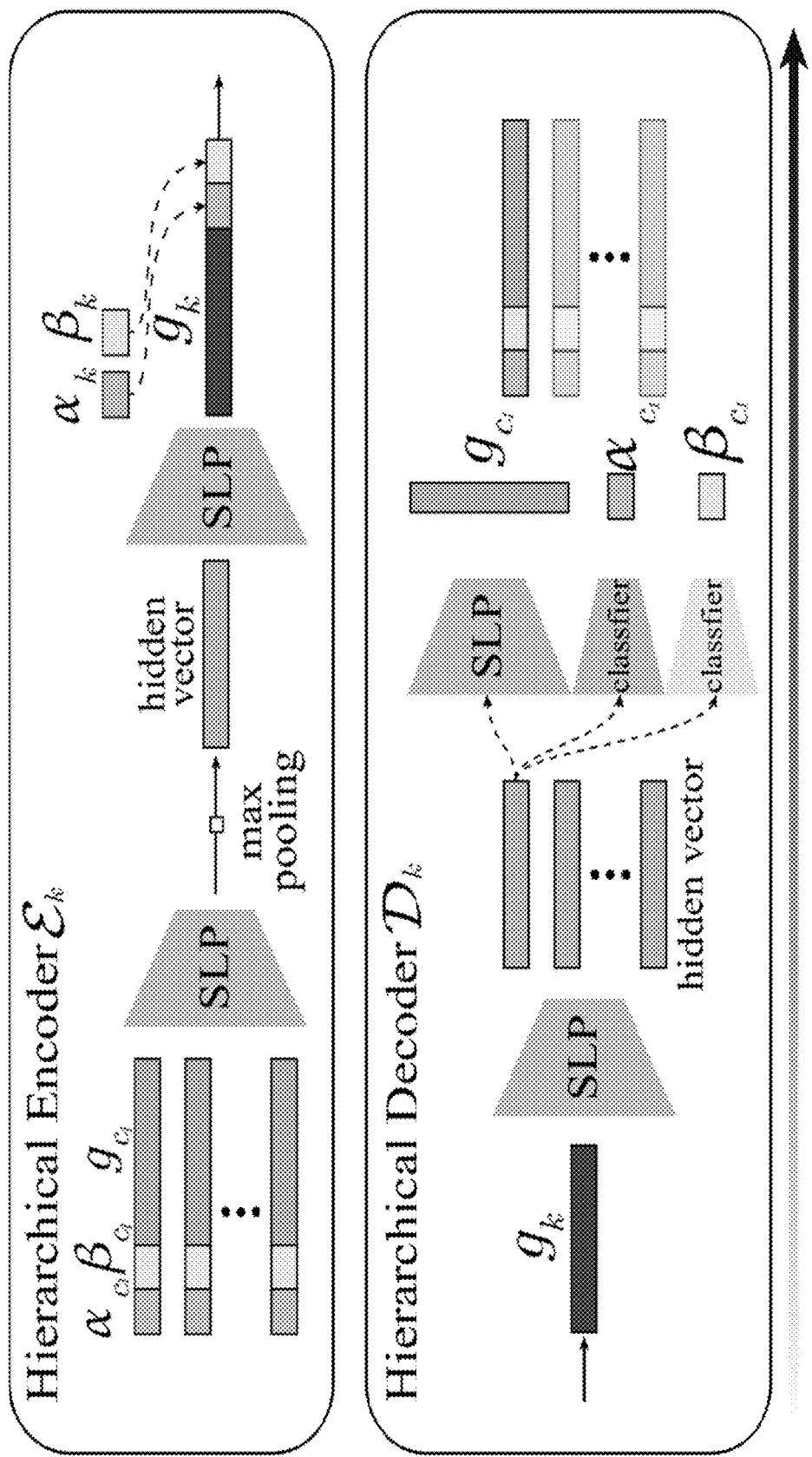
FIG. 4 is a diagram illustrating an exemplary architecture of local encoder $\{\varepsilon_i\}$ and decoder $\{D_i\}$ in accordance with some implementations of the present disclosure.

FIG. 4 is a diagram illustrating an exemplary architecture of local encoder $\{\varepsilon_i\}$ and decoder $\{D_i\}$ in accordance with some implementations of the present disclosure.

FIG. 4 shows the details of local encoder and decoder. For each octant, its binary indicator ($h_i$, $k_i$) is first computed which marks whether it encloses part of the surface and whether it needs further subdivision according to its enclosed geometry. Then, the geometry feature $g_i$ is extracted by passing its enclosed voxelized geometry to the voxel CNN. Next, the octant latent feature is obtained by concatenating $g_k$ with its structure features ($h_k$, $k_k$). The recursive feature encoding and aggregation is performed until the root node has been processed. At the end of encoder, the VAE reparameterization technique is used to encourage the distribution of the latent space to fit a normal distribution.

The hierarchical decoder aims to decode the octree structure and local octant codes from the input global feature. On the contrary to the encoder, the decoding process starts from the root node and recursively decodes the latent code of its child octants in a top-down manner. For each octant, the structure and geometry features ($h_i$, $k_i$, $g_i$) are decoded. The two indicators determine whether the child octants need to be decoded or subdivided. For those octants that need to be subdivided, all the 8 child octants are decoded at one time from the geometry features. This process is repeated until no octants need to be subdivided. Finally, a local implicit decoder is used to reconstruct the 3D surface within the octant by feeding its latent geometry feature and 3D query location.

In some embodiments, a hierarchical OctField network is implemented. To enable a differentiable framework for learning the octree structure and its encoded geometry, a novel hierarchical encoder-decoder network is implemented that organizes local encoders and decoders in a recursive manner. Both the octree structure information and the geometry feature are embedded into the latent code of each octant. As shown in the right part of FIG. 3, the latent code $e_i=(g_i, \alpha_i, \beta_i)$ for octant $O_i$ is a concatenation of three parts: (1) a geometry feature $g_i$ that encodes the local 3D shape; (2) a binary occupancy indicator $\alpha_i$ that indicates whether the octant encloses any 3D surface; and (3) a binary geometry subdivision indicator $\beta_i$ that denotes whether the enclosed geometry is intricate enough that needs further subdivision. How this configuration of latent vector guides the recursive decoding and encoding in the network is further illustrated herein. Note that, unlike the prior tree structure-based generative models, the method and systems disclosed herein does not require a manually labeled part hierarchy, e.g. the dataset, for training, and can generate the hierarchical structure automatically using our octree construction algorithm.

In some embodiments, a hierarchical encoder is implemented. As shown in FIG. 3 the encoder E of the network is composed of a hierarchy of local encoders $\{\varepsilon_i\}$ that encodes local geometry feature and octree structure into the latent code. While the framework supports general geometry encoders, a 3D voxel CNN ν is employed for extracting geometry features due to its simplicity of implementation. After constructing the octree for the input model, the surface enclosed in each octant is voxelized in a resolution of $32^3$.

In some embodiments, the encoding process starts from the octants at the finest level in a bottom-up manner. For each octant $O_i$, its binary indicators ($\alpha_i$, $\beta_i$) are first computed according to its enclosed geometry. In particular, $\alpha_i$ is set to 1 if there exist surfaces inside $O_i$ and is set to 0 if otherwise; $\beta_i$ is set to 1 if $O_i$'s enclosed geometry (if $\alpha_i$=1) satisfies the subdivision criteria and is set to 0 if otherwise.

$O_i$'s geometry feature $g_i$ is then extracted by passing its enclosed voxelized geometry $G_i$ to the voxel CNN v. When proceeding to a higher level, the network will aggregate the children's latent features to its parent octant. In particular, for a parent octant $O_k$, the octant features of its children is denoted as $\{e_{cj}=(g_{cj}, \alpha_{cj}, \beta_{cj})|c_j \in C_k\}$, where $C_i$ represents the child octants of $O_k$. Its encoder $\varepsilon_k$ then aggregates the latent features of $O_k$'S child octants into $O_k$'S geometry feature $g_k$:

$$g_k = \varepsilon_k(e_{c0}, e_{c1}, \ldots, e_{c7}). \quad (3)$$

In some embodiments, $O_k$'s latent feature is then obtained by concatenating $g_k$ with $O_k$'s structure features ($\alpha_k, \beta_k$). The recursive feature encoding and aggregation is performed until the root node has been processed. Specifically, the encoder $\varepsilon_i$ consists of a single-layer perceptron (SLP), one max pooling layer and another SLP for output. At the end of encoder, the VAE reparameterization technique is leveraged to encourage the distribution of the latent space to fit a normal distribution. Note that all the local encoders $\varepsilon_i$ share its parameters to leverage the similarity of local geometries and to reduce the network parameters.

In some embodiments, the hierarchical decoder D aims to decode the octree structure and local octant codes from the input global feature. It consists of a hierarchy of local decoders $\{D_i\}$ with a mirrored structure with respect to the encoder E. On the contrary to E, the decoding process starts from the root node and recursively decodes the latent code of its child octants in a top-down manner. Specifically, for a parent octant $O_k$ with geometry feature $g_k$, the geometry features of its child octants is decoded using the decoder $D_k$:

$$(e_{c0}, e_{c1}, \ldots, e_{c7}) = D_k(g_k), \quad (4)$$

where $c_j \in C_k$ denotes the child octant of $O_k$ and $e_{cj}=(g_{cj}, \alpha_{cj}, \beta_{cj})$ stands for the geometric feature and two indicators of the child octant $O_{cj}$. The two indicators provide the probability of whether the child octants need to be decoded or subdivided. Note that all the 8 child octants are decoded at one time.

In particular, $D_k$ consists of two SLPs and two classifiers (see FIG. 4). $g_k$ is first decoded into hidden vectors $v_{cj}$ for all 8 child octants by a SLP. To decode the structure information, two classifiers $I_g$ and $I_h$ are applied to infer the probability of surface occupancy and the necessity of further subdivision, respectively. For child octant $O_{cj}$, its hidden vector $v_{cj}$ is fed into $I_g$ and $I_h$, and calculate $\alpha_{cj}=I_g(v_{cj})$ and $\beta_{cj}=I_h(v_{cj})$. For predicting the $g_{cj}$, the other SLP is applied on $v_{cj}$. If $\alpha_{cj}<0.5$, it indicates that $O_{cj}$ does not contain any geometry and will not be further processed. If $\alpha_{cj}>0.5$, it means that $O_{cj}$ is occupied by the surface and the value of $\beta_{cj}$ is further checked. If $\beta_{cj}<0.5$, the octant is not further divided and its enclosed surface is inferred using the implicit octant decoder G and the geometric feature $g_{cj}$. If $\beta_{cj}>0.5$, the octant is subdivided by predicting the latent features of its child octants with the same procedure. This process is repeated until no octants need to be subdivided.

The total loss consists of geometric loss, structure loss, subdivision loss, and Kullback-Leibler (KL) divergence loss. Geometric loss is binary cross entropy (BCE) loss on point samples in 3D space. Structure and subdivision loss are BCE loss of classifying whether the octants are occupied and need to be subdivided respectively.

In some embodiments, a local implicit decoder G is used to reconstruct the 3D surface within the octant. For octant $O_i$, its latent geometry feature $g_i$ and the 3D query location x are fed to the implicit decoder G for signed distance prediction. G is trained with binary cross entropy loss on the point samples. The training loss for octant $O_i$ is:

$$Lgeo = \frac{\sum_{j \in P} Lc(G(gi, xj), F(xj)) \cdot wj}{\sum_{j \in P} w_j} \quad (5)$$

where F( ) returns the ground-truth label (inside/outside) for input point, $L_c(\cdot,\cdot)$ is the binary cross entropy loss, P denotes the set of sampling points, $w_j$ describes the inverse of sampling density near $x_j$ for compensating the density change. Note that G is pre-trained on all the local shape crops to encode stronger shape prior.

In some embodiments, in order to obtain stronger supervision, the local geometry of all the octants that are occupied by the surface is recovered regardless if it belongs to the finest level. Hence, the total loss for training the hierarchical encoder-decoder network is formulated as follows:

$$L_{total} = E_{Oi \in O}[\lambda Lgeo + L_h + L_k + \beta L_{KL}] \quad (6)$$

where $L_h$ and $L_k$ denote the binary cross entropy loss of classifying whether the octant contains geometry and needs to be subdivided, respectively, $L_{KL}$ is the KL divergence loss, and E[ ] returns the expected value over the set of all octants O that enclose surface geometry. In some embodiments, $\lambda=10.0$, $\beta=0.01$ are set.

FIG. 5 is a block diagram illustrating an exemplary 3D shape representation process using OctField in accordance with some implementations of the present disclosure.

The process 500 of representing the 3D shape, includes a step 502 of dividing a 3D space enclosing the 3D shape into a plurality of 3D spaces with a hierarchical octree structure.

The process 500 also includes a step 504 of generating local implicit functions, and each of the local implicit functions corresponds to a respective 3D space of the plurality of 3D spaces.

The process 500 additionally includes a step 506 of reconstructing a representation of the 3D shape from the local implicit functions with the hierarchical octree structure.

Additional implementations may include one or more of the following features.

In some embodiments, the step 502 of dividing the 3D space enclosing the 3D shape into the plurality of 3D spaces with the hierarchical octree structure includes: recursively subdividing the 3D space into child octants according to surface occupancy and richness of geometry of the 3D shape.

In some embodiments, the step 502 of dividing the 3D space enclosing the 3D shape into the plurality of 3D spaces with the hierarchical octree structure includes: training a neural network to divide the 3D space enclosing the 3D shape into the plurality of 3D spaces with the hierarchical octree structure.

In some embodiments, training the neural network to divide the 3D space includes: inputting into the neural network a training set of 3D shapes with constructed octree cells; mapping features extracted from the training set to latent space of hierarchical local encoders; and extracting the features of the latent space into the plurality of 3D spaces with the hierarchical octree structure through hierarchical local decoders.

In some embodiments, mapping the features extracted from the training set to the latent space of the hierarchical local encoders includes: computing by the neural network a first binary indicator from learning the training set that indicates whether a respective 3D space encloses part of a surface of the 3D shape; computing by the neural network a second binary indicator from learning the training set that indicates whether the respective 3D space needs further subdivision according to an enclosed geometry of the surface; and extracting a geometry feature of the respective 3D space by passing the enclosed geometry to the neural network. In some embodiments, the hierarchical local encoders encode the features extracted from the training set in a bottom-up order until a root node of the hierarchical octree structure has been processed.

In some embodiments, the neural network is a 3D voxel convolutional neural network.

In some embodiments, extracting the features of the latent space into the plurality of 3D spaces with the hierarchical octree structure through the hierarchical local decoders includes: extracting a first binary indicator that indicates whether a respective 3D space encloses part of a surface of the 3D shape; extracting a second binary indicator that indicates whether the respective 3D space needs further subdivision according to an enclosed geometry of the surface; and extracting geometry features from the respective 3D space. In some embodiments, the hierarchical local decoders extract the latent space in a top-down order until no octants need to be subdivided within the hierarchical octree structure.

In some embodiments, the step 504 of generating the local implicit functions includes: in accordance with a determination that a respective 3D space encloses part of a surface of the 3D shape, generating a respective local implicit function corresponding to a geometry of the part of the surface.

In some embodiments, the step 504 of generating the respective local implicit function corresponding to the geometry of the part of the surface includes: training a neural network to recognize the geometry of the part of the surface and to generate a respective local implicit function corresponding to the geometry of the part of the surface.

In some embodiments, the step 506 of reconstructing the representation of the 3D shape from the local implicit functions with the hierarchical octree structure includes: reconstructing a 3D surface of the 3D shape within the respective 3D space with a respective local implicit function using geometry feature and 3D location of the 3D surface; and converting the local implicit functions within the hierarchical octree structure to a 3D mesh output.

In some embodiments, the 3D shape includes a partial 3D shape comprising a 3D partial point cloud or a 3D mesh.

In some embodiments, the 3D shape includes a 2D image.

Figure 6:
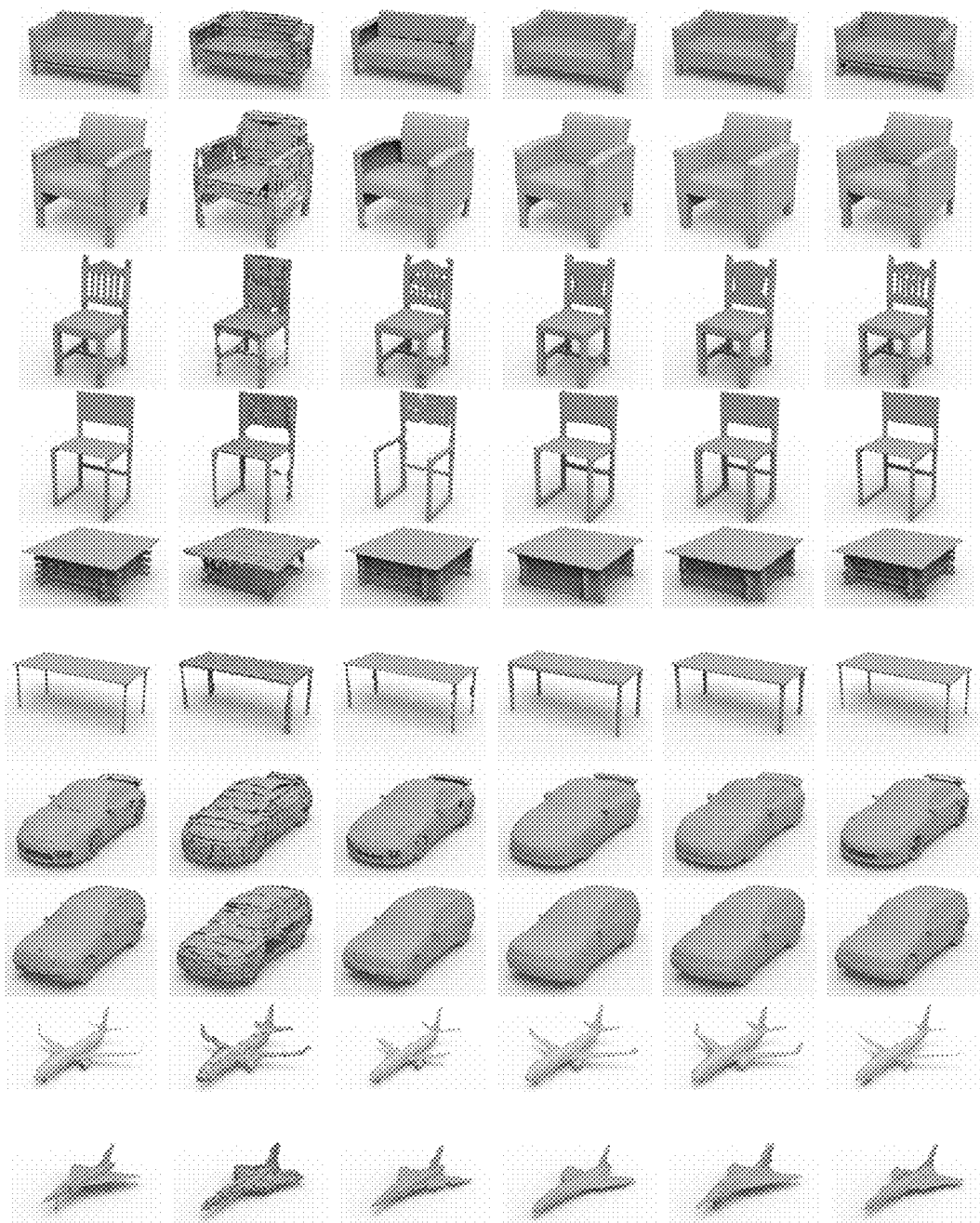
FIG. 6 shows the shape reconstruction comparison between OctField and the baseline methods: Adaptive O-CNN (AOCNN), Local Implicit Grids (LIG), OCCNet, IM-Net in accordance with some implementations of the present disclosure.

Table 1 shows quantitative evaluation on shape reconstruction of the OctField compared with other baselines according to some implementations of the present disclosure. As shown in Table 1, OctField can achieve the best performance on average score and in each category by comparing with four baselines: IM-Net, OCCNet, Local Implicit Grids (LIG), Adaptive O-CNN (AOCNN). FIG. 6 shows the shape reconstruction comparison between OctField and the baseline methods: AOCNN, LIG, OCCNet, IM-Net in accordance with some implementations of the present disclosure. The shape reconstruction results for different methods are illustrated in columns in FIG. 6.

TABLE 1

Quantitative evaluation on shape reconstruction of the OctField compared with other baselines according to some implementations of the present disclosure.

| Metric | Method | Plane | Car | Chair | Table | Sofa | Mean |
|---|---|---|---|---|---|---|---|
| $CD\downarrow \times 10^{-4}$ | IM-Net | 4.21 | 15.14 | 6.99 | 8.03 | 7.95 | 8.46 |
| | OccNet | 5.62 | 13.54 | 7.87 | 7.47 | 8.60 | 8.62 |
| | LIG | 2.50 | 5.46 | 2.37 | 2.81 | 3.23 | 3.27 |
| | AOCNN | 6.90 | 16.61 | 10.80 | 9.15 | 9.40 | 10.57 |
| | OctField | 2.29 | 4.84 | 2.19 | 2.53 | 3.02 | 2.97 |
| $EMD\downarrow \times 10^{-2}$ | IM-Net | 3.39 | 4.46 | 3.77 | 3.16 | 2.51 | 3.45 |
| | OccNet | 3.46 | 4.93 | 4.16 | 3.34 | 2.81 | 3.74 |
| | LIG | 2.57 | 4.08 | 2.18 | 2.27 | 2.06 | 2.63 |
| | AOCNN | 4.26 | 5.63 | 6.76 | 4.78 | 3.49 | 4.98 |
| | OctField | 2.47 | 2.79 | 2.13 | 1.70 | 1.84 | 2.19 |

In addition, comparisons with LDIF are provided and (CD, IoU) results (0.20, 92.8) on Chair category are better than those of LDIF (0.34, 87.5). Compared with the existing methods based on octrees and implicit functions, the OctField method can achieve better reconstruction accuracy.

Table 2 shows the memory consumption with respect to different levels of decomposition of OctField compared with LIG according to some implementations of the present disclosure.

Moreover, the average inference time for the objects reported in Table 1 above is 114.6 second for LIG and 5.4 second for OctField. For the large scene, LIG uses 114.9 second while OctField uses 22.7 second. Compared with the local implicit function representation with regular subdivision of 3D space, the representation of OctField uses less memory and computational cost.

TABLE 2

The memory consumption with respect to different levels of decomposition of OctField compared with LIG according to some implementations of the present disclosure.

| | level | 1 | 2 | 3 | 4 |
|---|---|---|---|---|---|
| Number of cells | LIG | 8 | 64 | 512 | 4096 |
| | OctField | 8 | 30 | 200 | 1000 |
| Memory (GB) | LIG | 0.1 | 0.6 | 5 | 40 |
| | OctField | 0.2 | 1.2 | 4.8 | 23 |

In some embodiments, the 3D voxel CNNs of local encoders can also be replaced with other encoders that extract geometry feature such as PointNet++ for point clouds.

Further embodiments also include various subsets of the above embodiments combined or otherwise re-arranged in various other embodiments.

Herein, an image processing apparatus of the embodiments of the present application is implemented with reference to descriptions of accompanying drawings. The image processing apparatus may be implemented in various forms, for example, different types of computer devices such as a server or a terminal (for example, a desktop computer, a notebook computer, or a smartphone). A hardware structure of the image processing apparatus of the embodiments of the present application is further described below. It may be understood that FIG. 7 merely shows an exemplary structure, rather than all structures, of the image processing apparatus, and a partial or entire structure shown in FIG. 7 may be implemented according to requirements.

Figure 7:
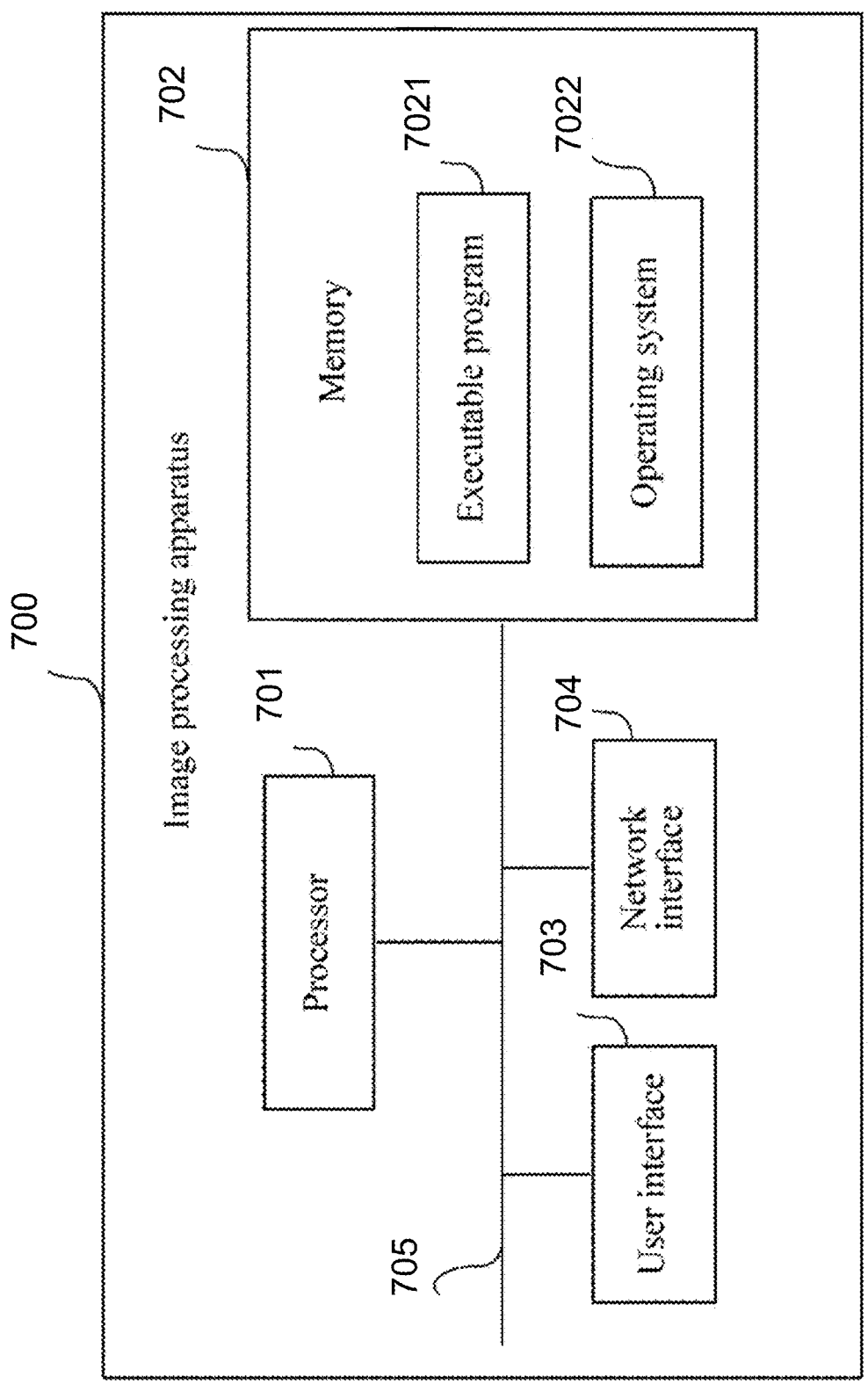
FIG. 7 is a schematic diagram of an exemplary hardware structure of an image processing apparatus in accordance with some implementations of the present disclosure.

Referring to FIG. 7, FIG. 7 is a schematic diagram of an optional hardware structure of an image processing apparatus according to an embodiment of the present application, and in an actual application, may be applied to the server or various terminals running an application program. An image processing apparatus 700 shown in FIG. 7 includes: at least one processor 701, a memory 702, a user interface 703, and at least one network interface 704. Components in the image processing apparatus 700 are coupled together by means of a bus system 705. It may be understood that the bus 705 is configured to implement connection and communication between the components. The bus system 705, besides including a data bus, may further include a power bus, a control bus, and a status signal bus. However, for a purpose of a clear explanation, all buses are marked as the bus system 705 in FIG. 7.

The user interface 703 may include a display, a keyboard, a mouse, a trackball, a click wheel, a key, a button, a touchpad, a touchscreen, or the like.

It may be understood that the memory 702 may be a volatile memory or a non-volatile memory, or may include both a volatile memory and a non-volatile memory.

The memory 702 in the embodiments of the present application is configured to store different types of data to support operations of the image processing apparatus 700. Examples of the data include: any computer program, such as an executable program 7021 and an operating system 7022, used to perform operations on the image processing apparatus 700, and a program used to perform the image processing method of the embodiments of the present application may be included in the executable program 7021.

The image processing method disclosed in the embodiments of the present application may be applied to the processor 701, or may be performed by the processor 701. The processor 701 may be an integrated circuit chip and has a signal processing capability. In an implementation process, each step of the image processing method may be completed by using an integrated logic circuit of hardware in the processor 701 or an instruction in a software form. The foregoing processor 701 may be a general-purpose processor, a digital signal processor (DSP), another programmable logic device, a discrete gate, a transistor logic device, a discrete hardware component, or the like. The processor 701 may implement or execute methods, steps, and logical block diagrams provided in the embodiments of the present application. The general purpose processor may be a microprocessor, any conventional processor, or the like. The steps in the method provided in the embodiments of the present application may be directly performed by a hardware decoding processor, or may be performed by combining hardware and software modules in a decoding processor. The software module may be located in a storage medium. The storage medium is located in the memory 702. The processor 701 reads information in the memory 702 and performs steps of the image processing method provided in the embodiments of the present application by combining the information with hardware thereof.

In some embodiments, the image processing and OctField formation can be accomplished on a group of servers or a cloud on a network.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of representing a 3D shape, comprising:
   dividing a 3D space enclosing the 3D shape into a plurality of 3D spaces within a hierarchical octree structure, including:
   obtaining a set of initial 3D spaces; and
   for each initial 3D space in the set of initial 3D spaces:
   in accordance with a determination that the initial 3D space does not include any portion of a surface of the 3D shape, forgoing subdividing the initial 3D space;

in accordance with a determination that the initial 3D space includes at least a portion of the surface of the 3D shape and a determination that the at least a portion of the surface meets one or more smoothness criteria, forgoing subdividing the initial 3D space; and in accordance with a determination that the initial 3D space includes the at least a portion of the surface of the 3D shape and a determination that the at least a portion of the surface does not meet one or more smoothness criteria, recursively subdividing the initial 3D space into a set of child 3D spaces in accordance with the one or more smoothness criteria;

generating local implicit functions, each of the local implicit functions corresponding to a respective 3D space of the plurality of 3D spaces; and reconstructing a representation of the 3D shape from the local implicit functions within the hierarchical octree structure.

2. The method according to claim 1, wherein dividing the 3D space enclosing the 3D shape into the plurality of 3D spaces within the hierarchical octree structure comprises:

training a neural network to divide the 3D space enclosing the 3D shape into the plurality of 3D spaces within the hierarchical octree structure.

3. The method according to claim 2, wherein training the neural network to divide the 3D space includes:

inputting into the neural network a training set of 3D shapes with constructed octree cells;

mapping features extracted from the training set to latent space of hierarchical local encoders; and extracting the features of the latent space into the plurality of 3D spaces within the hierarchical octree structure through hierarchical local decoders.

4. The method according to claim 3, wherein mapping the features extracted from the training set to the latent space of the hierarchical local encoders includes:

computing by the neural network a first binary indicator from learning the training set that indicates whether a respective 3D space encloses part of a surface of the 3D shape;

computing by the neural network a second binary indicator from learning the training set that indicates whether the respective 3D space needs further subdivision according to an enclosed geometry of the surface; and extracting a geometry feature of the respective 3D space by passing the enclosed geometry to the neural network;

wherein the hierarchical local encoders encode the features extracted from the training set in a bottom-up order until a root node of the hierarchical octree structure has been processed.

5. The method according to claim 3, wherein the neural network is a 3D voxel convolutional neural network.

6. The method according to claim 3, wherein extracting the features of the latent space into the plurality of 3D spaces within the hierarchical octree structure through the hierarchical local decoders includes:

extracting a first binary indicator that indicates whether a respective 3D space encloses part of a surface of the 3D shape;

extracting a second binary indicator that indicates whether the respective 3D space needs further subdivision according to an enclosed geometry of the surface; and extracting geometry features from the respective 3D space;

wherein the hierarchical local decoders extract the latent space in a top-down order until no octants need to be subdivided within the hierarchical octree structure.

7. The method according to claim 1, wherein generating the local implicit functions includes:

in accordance with a determination that a respective 3D space encloses part of a surface of the 3D shape, generating a respective local implicit function corresponding to a geometry of the part of the surface.

8. The method according to claim 7, wherein generating the respective local implicit function corresponding to the geometry of the part of the surface includes:

training a neural network to recognize the geometry of the part of the surface and to generate a respective local implicit function corresponding to the geometry of the part of the surface.

9. The method according to claim 1, wherein reconstructing the representation of the 3D shape from the local implicit functions within the hierarchical octree structure includes:

reconstructing a 3D surface of the 3D shape within the respective 3D space with a respective local implicit function using a geometry feature and 3D location of the 3D surface; and converting the local implicit functions within the hierarchical octree structure to a 3D mesh output.

10. The method according to claim 1, wherein the 3D shape includes a partial 3D shape comprising a 3D partial point cloud or a 3D mesh.

11. The method according to claim 1, wherein the 3D shape includes a 2D image.

12. An electronic apparatus comprising one or more processing units, memory coupled to the one or more processing units, and a plurality of programs stored in the memory that, when executed by the one or more processing units, cause the electronic apparatus to perform a plurality of operations of representing a 3D shape, comprising:

dividing a 3D space enclosing the 3D shape into a plurality of 3D spaces within a hierarchical octree structure, including:

obtaining a set of initial 3D spaces; and for each initial 3D space in the set of initial 3D spaces:

in accordance with a determination that the initial 3D space does not include any portion of a surface of the 3D shape, forgoing subdividing the initial 3D space;

in accordance with a determination that the initial 3D space includes at least a portion of the surface of the 3D shape and a determination that the at least a portion of the surface meets one or more smoothness criteria, forgoing subdividing the initial 3D space; and in accordance with a determination that the initial 3D space includes the at least a portion of the surface of the 3D shape and a determination that the at least a portion of the surface does not meet one or more smoothness criteria, recursively subdividing the initial 3D space into a set of child 3D spaces in accordance with the one or more smoothness criteria;

generating local implicit functions, each of the local implicit functions corresponding to a respective 3D space of the plurality of 3D spaces; and reconstructing a representation of the 3D shape from the local implicit functions within the hierarchical octree structure.

13. The electronic apparatus according to claim 12, wherein dividing the 3D space enclosing the 3D shape into the plurality of 3D spaces within the hierarchical octree structure comprises:
    training a neural network to divide the 3D space enclosing the 3D shape into the plurality of 3D spaces within the hierarchical octree structure.

14. The electronic apparatus according to claim 13, wherein training the neural network to divide the 3D space includes:
    inputting into the neural network a training set of 3D shapes with constructed octree cells;
    mapping features extracted from the training set to latent space of hierarchical local encoders; and
    extracting the features of the latent space into the plurality of 3D spaces within the hierarchical octree structure through hierarchical local decoders.

15. The electronic apparatus according to claim 12, wherein generating the local implicit functions includes:
    in accordance with a determination that a respective 3D space encloses part of a surface of the 3D shape, generating a respective local implicit function corresponding to a geometry of the part of the surface.

16. The electronic apparatus according to claim 15, wherein generating the respective local implicit function corresponding to the geometry of the part of the surface includes:
    training a neural network to recognize the geometry of the part of the surface and to generate a respective local implicit function corresponding to the geometry of the part of the surface.

17. The electronic apparatus according to claim 12, wherein reconstructing the representation of the 3D shape from the local implicit functions within the hierarchical octree structure includes:
    reconstructing a 3D surface of the 3D shape within the respective 3D space with a respective local implicit function using a geometry feature and 3D location of the 3D surface; and
    converting the local implicit functions within the hierarchical octree structure to a 3D mesh output.

18. A non-transitory computer readable storage medium storing a plurality of programs for execution by an electronic apparatus having one or more processing units, wherein the plurality of programs, when executed by the one or more processing units, cause the electronic apparatus to perform a plurality of operations of representing a 3D shape, comprising:
    dividing a 3D space enclosing the 3D shape into a plurality of 3D spaces within a hierarchical octree structure, including:
        obtaining a set of initial 3D spaces; and
        for each initial 3D space in the set of initial 3D spaces:
            in accordance with a determination that the initial 3D space does not include any portion of a surface of the 3D shape, forgoing subdividing the initial 3D space;
            in accordance with a determination that the initial 3D space includes at least a portion of the surface of the 3D shape and a determination that the at least a portion of the surface meets one or more smoothness criteria, forgoing subdividing the initial 3D space; and
            in accordance with a determination that the initial 3D space includes the at least a portion of the surface of the 3D shape and a determination that the at least a portion of the surface does not meet one or more smoothness criteria, recursively subdividing the initial 3D space into a set of child 3D spaces in accordance with the one or more smoothness criteria;
    generating local implicit functions, each of the local implicit functions corresponding to a respective 3D space of the plurality of 3D spaces; and
    reconstructing a representation of the 3D shape from the local implicit functions within the hierarchical octree structure.

19. The non-transitory computer readable storage medium according to claim 18, wherein dividing the 3D space enclosing the 3D shape into the plurality of 3D spaces within the hierarchical octree structure comprises:
    training a neural network to divide the 3D space enclosing the 3D shape into the plurality of 3D spaces within the hierarchical octree structure.

20. The non-transitory computer readable storage medium according to claim 18, wherein generating the local implicit functions includes:
    in accordance with a determination that a respective 3D space encloses part of a surface of the 3D shape, generating a respective local implicit function corresponding to a geometry of the part of the surface.

* * * * *